J. M. STORY.
Gang Saw Mill.
No. 235,824.  Patented Dec. 21, 1880.
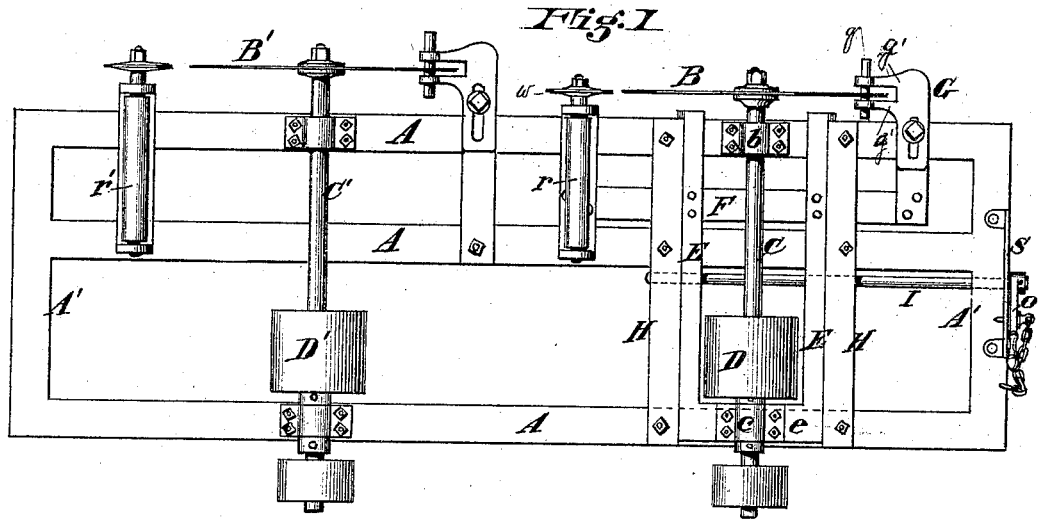
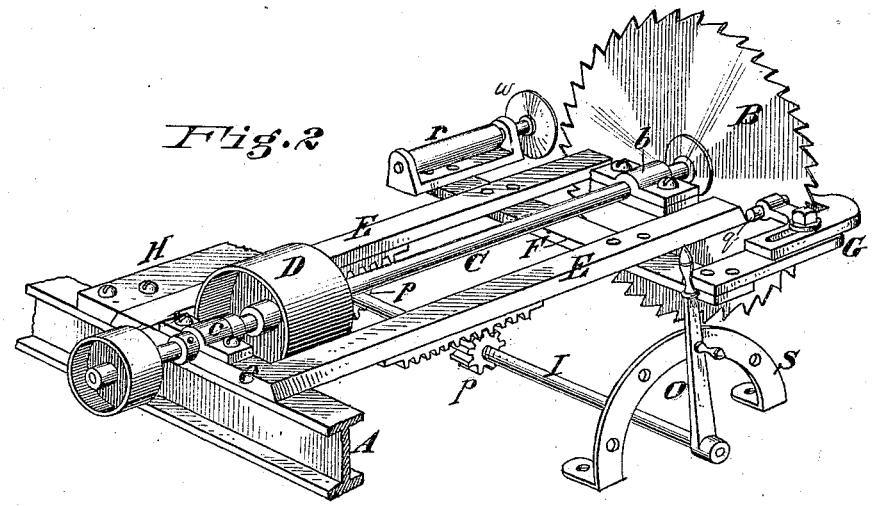

UNITED STATES PATENT OFFICE.

JOSEPH M. STORY, OF CINCINNATI, OHIO.

GANG-SAW MILL.

SPECIFICATION forming part of Letters Patent No. 235,824, dated December 21, 1880.

Application filed January 23, 1880.

*To all whom it may concern:*

Be it known that I, JOSEPH M. STORY, of Cincinnati, Hamilton county, Ohio, have invented a new and useful Improvement in Circular-Saw Mills, of which the following is a specification.

My invention relates to circular log-sawing machines designed to be used in connection with a reciprocating log-carrier; and its object is to increase their utility and capacity by adapting them to cut two or more planks at one movement or in successive movements of the carriage.

To this end my invention consists, primarily, in the combination, with a fixed supporting-frame, of a supplemental frame laterally adjustable thereon, carrying upon the projecting extremity of a mandrel suitably journaled in said supplemental frame, a circular saw provided with a spreader, saw-guide, and plank-support attached to and adjustable with said supplemental frame, so as to preserve always the same relation to the saw.

It consists, also, in the combination, on one supporting-frame, of fixed and adjustable saws having fixed and adjustable spreaders, guides, and plank-supports, whereby two or more planks of adjustable widths may be cut from the log at one movement of the carriage, or at successive movements, as may be arranged.

It consists, lastly, in the details of construction and arrangement of parts, as hereinafter pointed out.

My invention is embodied in mechanism illustrated in the accompanying drawings, in which—

Figure 1 is a plan view of a gang-saw mill, showing a fixed and adjustable saw and attachments; and Fig. 2 a perspective view of the adjustable saw and frame, showing the adjusting mechanism.

Similar letters indicate like parts in the drawings.

A A A in the drawings are the longitudinal sills, and A' A' the end sills of the bed or frame which is to be placed adjacent to the path of the carrier, and B B' adjustable and fixed saws, respectively, which, in the present case, are shown mounted on the same general frame or bed.

The adjustable frame in the present case consists of two side pieces, E E, and an end cross-piece, e, securing them, leaving the end toward the saw open; but a similar cross-piece, F, secured to the under sides of the parts E E, holds the latter in position, thus constituting a rectangular frame having an open end. This supplemental frame is arranged to move laterally upon the bed-sills A in adjustable guides H H, secured transversely to the sills, for which purpose the guides H H are beveled on the sides adjacent to the movable frame, and the sides E correspondingly beveled, thus retaining the frame in a long lateral bearing upon the bed-sills A.

Secured centrally in the frame above described is the mandrel C, having its remote end journaled in the cross-piece e, the other bearing, b, being rigidly secured to the outer sill, A, of the bed-frame, in which bearing the mandrel has a longitudinal movement as actuated by the frame.

The adjustable frame is provided on the under side of its side pieces, E E, with cogs, which mesh with the teeth of pinions $p$ $p$ upon a shaft, I, secured longitudinally in the bed beneath the supplemental frame in bearings upon the end sill, A', and one of the guides, H, respectively; and to the projecting end of the shaft I is secured a hand-lever, O, operating in connection with a rack-bar, S, having a scale or suitable stops thereon with means for securing the shaft in any desired position. By the vibration of the lever the saw B is adjusted to any desired plane of cut within the limit of its movement.

To one of the side pieces E of the adjustable frame a bar, G, is secured projecting beyond, and provided with jaws $g'$ $g'$, extending a short distance on either side of and inclosing the cutting-edge of the saw. The jaws $g'$ $g'$ are pierced with holes at right angles to the edge of the saw, in which are placed wooden pins $q$, between which the blade of the saw revolves, but which prevent any lateral play. Projecting from the other side bar of the movable frame is a spindle, on which is loosely centered a circular wedge or spreader, $w$, and a roller, $r$, the former being arranged in the plane of the saw and the latter in the path of the plank cut from the log, both having the usual functions. Being thus attached to the movable frame they act with it, and are thus maintained always in the same relations to the saw.

With a machine thus constructed placed in the path of a log-carrier, several planks can be severed from the log without the necessity of shifting the log at each return of the carrier, and used in connection with an additional fixed saw two planks may be severed at one movement, while if the adjustable saw is rotated in the opposite direction from the fixed saw, its adjustability enables one plank to be cut at one moment by the fixed saw and another during the return of the carriage by the adjustable saw; but the benefits of my invention are more perfectly attained by mounting the fixed and adjustable saws on the same bed-sills, as shown in the drawings, the additional saw B' being mounted on a mandrel, C', seated in fixed bearings on the sills A, and arranged to cut in the same or a parallel plane with the saw B, before described.

The operation has already been sufficiently indicated. The apparatus is placed so that the saws stand in the line of travel of the carrier, and are driven by power communicated to the pulleys D D', respectively.

I am aware that it is not new to use spreaders and guides with saws for heavy work. Also, that these have been used with a saw laterally adjustable on its frame.

I am also aware that fixed and adjustable saws have been employed together for light work, such as tenoning, sawing shingles, &c.

Having described my invention, I claim and desire to secure by Letters Patent—

1. The combination, in a log-sawing machine, of a circular saw secured to a mandrel suitably mounted on the supporting-frame and revolving in a fixed plane, and provided with a spreader, plank-support, and guide, with a saw secured upon an independent mandrel, and having a lateral adjustment in suitable bearings on the supporting-frame, and provided with a retaining-guide, spreader, and plank-support adjustable with it, so as to preserve a constant relation to the saw, whereby the latter saw with its specified attachments may be adjusted laterally in relation to the fixed saw to cut in different parallel planes from a log borne past upon a reciprocating log-carriage, substantially as set forth.

2. In a circular sawing machine, the combination of a supporting-frame, an independent horizontal shaft extending transversely across and projecting beyond said frame and carrying a circular saw on such projecting end, a horizontal shaft having one end journaled in a frame capable of adjustment across the supporting-frame, the other end of said shaft revolving and adapted to slide longitudinally in a fixed bearing on the supporting-frame and carrying a circular saw outside of the latter, substantially as and for the purpose set forth.

3. In a circular sawing machine, the combination of a supporting-frame, a horizontally-sliding frame arranged in suitable guideways, and provided on its under side with a rack, a horizontal shaft having one end arranged in a bearing on the sliding frame, and its other end revolving and capable of sliding horizontally in a fixed bearing on the supporting-frame and carrying a circular saw outside the same, with a shaft having a pinion engaging the rack on the sliding frame, and provided at one end with an operating-lever for moving said frame horizontally, substantially as described.

In testimony whereof I have hereunto set my hand this 15th day of January, A. D. 1880.

JOSEPH M. STORY.

Witnesses:
L. M. HOSEA,
JOSEPH C. HOSEA.